Jan. 26, 1965　　　A. C. COTÉ ETAL　　　3,166,974
OPTICAL DISPLAY APPARATUS
Filed June 5, 1962　　　　　　　　　　　　2 Sheets-Sheet 1

INVENTORS
ALPHONSE C. COTE'
DANIEL F. STANFILL, III
BY

AGENT

Jan. 26, 1965  A. C. COTÉ ETAL  3,166,974
OPTICAL DISPLAY APPARATUS
Filed June 5, 1962  2 Sheets-Sheet 2
Fig. 2
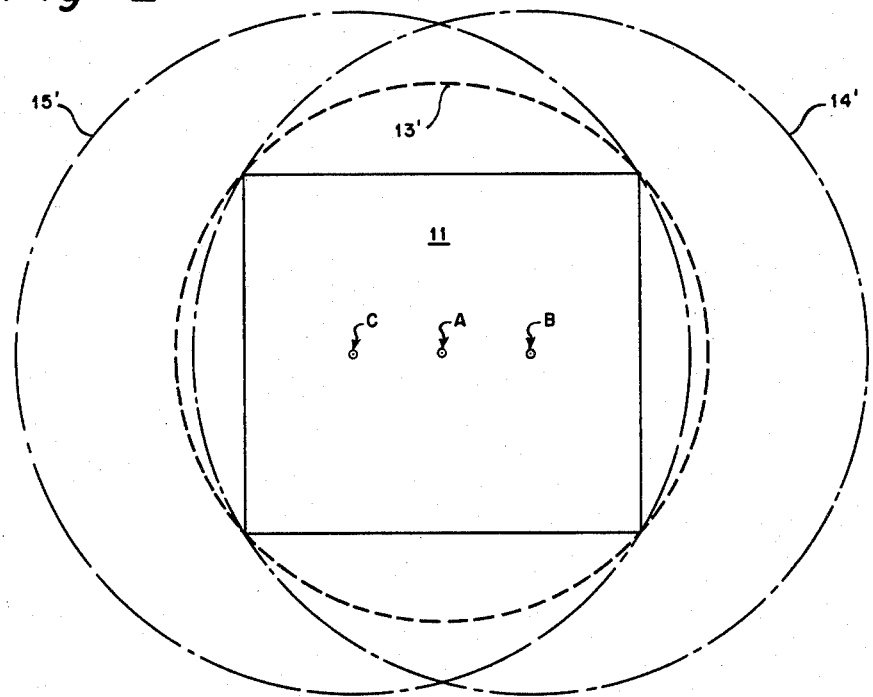
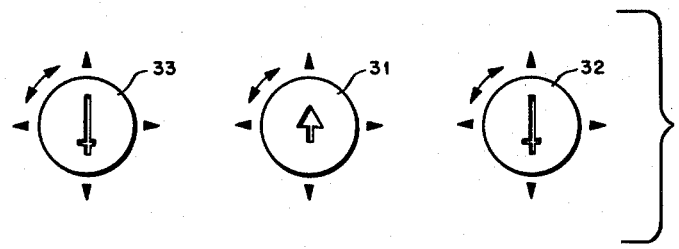
Fig. 3
INVENTORS
ALPHONSE C. COTE'
DANIEL F. STANFILL, III
BY
AGENT

United States Patent Office 3,166,974
Patented Jan. 26, 1965

3,166,974
OPTICAL DISPLAY APPARATUS
Alphonse C. Coté, Centereach, N.Y., and Daniel F. Stanfill III, Springdale, Conn., assignors, by mesne assignments, to the United States of America as represented by the Secretary of the Navy
Filed June 5, 1962, Ser. No. 200,292
9 Claims. (Cl. 88—24)

The present invention relates to an optical display apparatus and more particularly to an optical projection system for use on tactical navigation missions wherein the position and movement of an aircraft and a target relative to stationary objects are continuously displayed on a screen in the aircraft.

Navigational instrumentation has become increasingly complex during recent developments especially where they are applied to navigation missions. This is because of the change in nature and increase in the number of the elements used in these missions. For example, certain anti-submarine warfare missions use an aircraft and several sonobuoys in order to detect and locate a submerged submarine. Display systems integrated with the navigational instrumentation pictorially display the complete tactical situation of the searching aircraft, detecting and locating sonobuoys and the target submarine and considerably simplifies analysis of data necessary to execute a successful mission by the searching aircraft. One such integrated system adapted for this purpose is disclosed in patent application Serial No. 136,982 of Pliny G. Holt for Tactical Navigation System filed September 1, 1961. The present invention contemplates an improvement in the optical display portion whereby its construction is simplified and several advantages are obtained as hereinafter pointed out.

The above-mentioned optical display of Holt utilizes three separate and independent light projectors in which illuminated symbols formed by a reticle in each are positioned on a common translucent screen. Each symbol is movable across the screen by a two-axis tilting mirror. The cross-coupling or interaction between the two axes of the tilting mirrors will produce some degree of non-linear motion and result in a distortion or geometrical error of the symbol, known as "keystoning." Where the amount of "keystoning" is intolerable, compensation is required. Patent application Serial No. 156,176, now Patent No. 3,140,341 of Pliny G. Holt for Mirror Positioning Apparatus filed November 30, 1961 disclosed one means for such compensation.

A general purpose of the present invention is to provide an optical display apparatus of the above-described type which affords a more simplified projection system wherein the need for compensation of "keystoning" or geometric distortion is eliminated. The invention also includes provisions for obtaining maximum brightness of the illuminated symbols on the screen irrespective of their positions whereby a single low-wattage projection lamp can be used instead of a separate lamp for each projection system.

Accordingly, it is an object of the present invention to provide a novel optical display apparatus with which a plurality of illuminated symbols are projected on a translucent screen representing a geographical area of interest, with which the symbols are movable over the screen in accordance with position of objects which they represent, in which symbol movements are free from geometrical distortion irrespective of their position on the screen, and with which highly complex tactical situations can be pictorially displayed in sufficient detail and clarity as to provide rapid analysis for successfully completing a particular military mission.

Another object of the invention is to provide an improved optical display apparatus in which the symbol brightness on the translucent screen is maintained relatively high irrespective of the position of the symbol on the screen whereby a single low-wattage projection lamp may be utilized for a plurality of projection systems.

Still another object of the present invention is to provide an improved optical display apparatus for projection illuminated symbols on a navigational display screen particularly adapted for airborne use in anti-submarine warfare and similar tactical navigation missions in which relatively few parts are required, and which is relatively simple to construct, inexpensive, efficient, and reliable.

Various other objects and advantages will appear from the following description of one embodiment of the invention, and the most novel features will be particularly pointed out hereinafter in connection with the appended claims.

In the accompanying drawings:

FIG. 2 represents a front view of the optical display apparatus of FIG. 1 superimposed by the field of projection of the projecting lenses at the focal plane; and FIG. 3 represents the reticles of the optical display apparatus of FIG. 1 for forming and positioning the symbols on the translucent screen.

Figure 1:
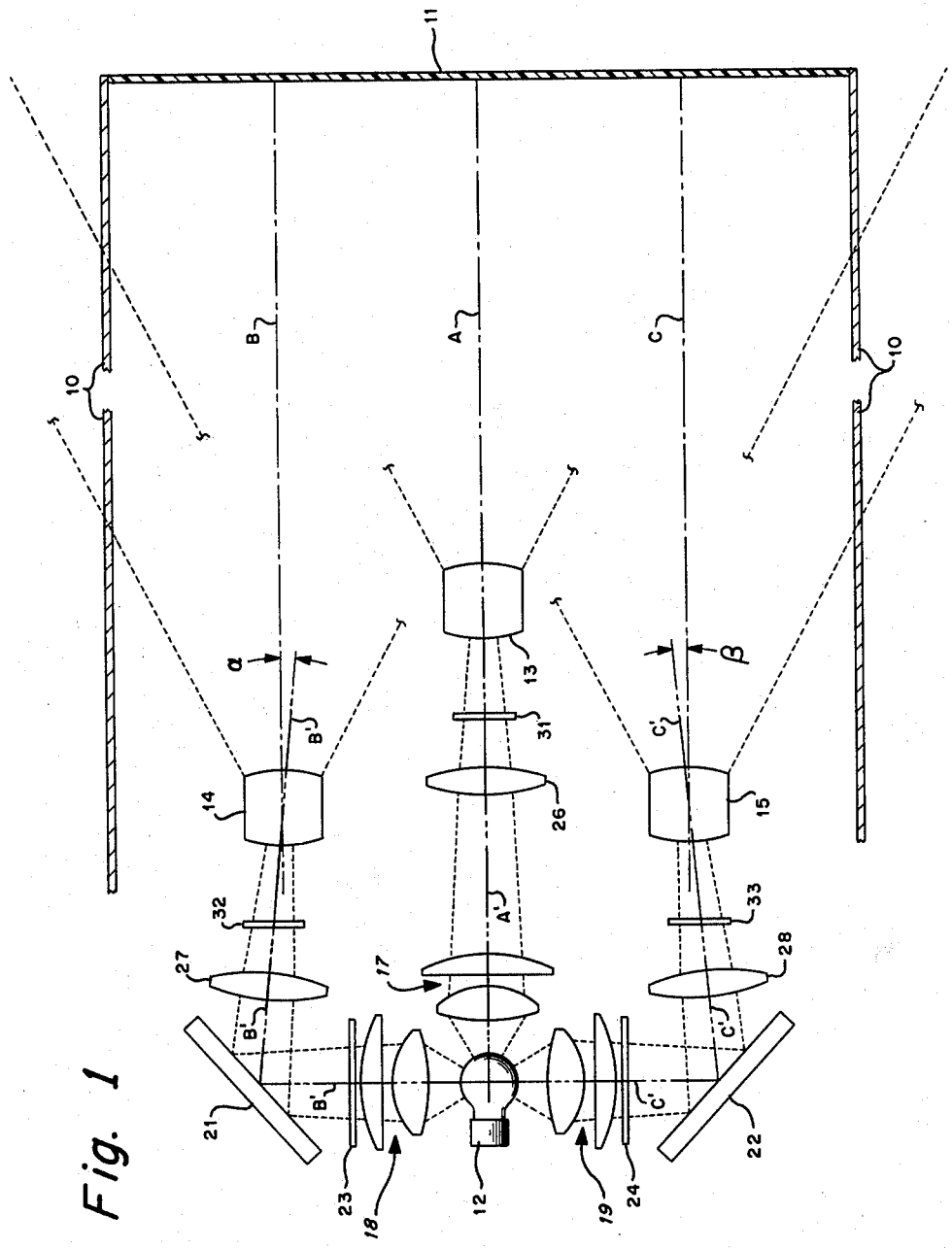
FIG. 1 represents a diagrammatic top view of the optical display apparatus of the present invention.

In the illustrated embodiment of the invention, a plurality of optical projection systems are contained in a housing 10 which supports a rectangular translucent screen 11 on the front portion thereof for viewing. The housing 10 is of a size and configuration suitable for mounting in the cockpit of an aircraft beside the instrument panel whereby the pilot can readily view the screen 11. The optical projection systems are merely represented schematically in order to show more clearly the fundamental inventive concepts. Detailed structure and connecting elements for maintaining the projection systems in spatial relationship to each other have not been shown and may be any conventional mechanical expedients consistent with good design practice.

The optical display apparatus is basically comprised of three optical systems including projectors 13, 14 and 15 having parallel optical axes A, B and C which project light beams from a single light source or lamp 12. The axes A, B and C are normal to the surface of the screen 11 with axis A intersecting the screen 11 at the center thereof, and the axes B and C are displaced equidistantly on each side of the axis A. For an object distance containing reticles, to be discussed later, the image planes of each projector 13, 14 and 15 will lie on the surface of the screen 11. The field or area of projection of each projector must be sufficient to completely cover the screen 11; that is, a common area of projection of all of the image planes must include the area of the screen 11. In FIG. 2, the fields of projection for projectors 13, 14 and 15 are shown by the chain-lined circles 13', 14' and 15', respectively; and the common area of projection is bounded by upper and lower arcs of the circle 13', a leftward arc of the circle 14' and a rightward arc of the circle 15'.

Light from the lamp 12 is gathered by three condenser lens assemblies, indicated generally by the numerals 17, 18 and 19, and is concentrated at their respective axes A', B', and C'. The axis A' of the condenser lens assembly 17 is coincident with the optical axis A, and the axes B' and C' are normal to the axis A', extending laterally from the center of the light source 12 to oppositely disposed mirrors 21 and 22 which fold the axes B' and C', respectively, to direct the concentrated light beam in the general direction of the screen 11. Color filters 23 and 24 are added to obtain different color illuminated symbols on the screen 11 from the light beams projected along the axes B' and C'.

As noted above, the optical axes B and C of the projectors 14 and 15 are parallel to the axis A. However, the axes B' and C' of the light beams reflected by the mirrors 21 and 22 are symmetrically folded slightly more than 90 degrees so that the folded portions of axes B' and C' form equal and opposite angles $\alpha$ and $\beta$, with the light beams thereof converging toward the axis A.

The light beams concentrated along the axes A', B', and C' are further condensed by condensing lenses 26, 27 and 28, respectively. The optical axes of these lenses coincide with the axes A', B' and C' so that the light beams condensed thereby are concentrated on three reticles 31, 32 and 33, also disposed on the axes A', B' and C', respectively.

The reticles 31, 32 and 33 are what characterize illuminated symbols by allowing only a portion of the light beam from condenser lenses 26, 27 and 28 from reaching the projectors 13, 14 and 15. FIG. 3 illustrates the reticles 31, 32 and 33 for generating an arrow, and two range strobes which are especially useful in the navigation system of patent application Serial No. 136,982, supra. The arrows illustrated at each reticle in FIG. 3 are to indicate that it is translatable and rotatable in the directions shown in planes normal to the axes A, B and C. The precise position of the reticles 26, 27 and 28 on the axes A, B' and C' are such that their center positions of translation are on these axes. By this arrangement, the light beams are concentrated on the portions of the projectors 13, 14 and 15 which project to the common area of coverage on the screen 11, no attempt being made to illuminate the area of projection that falls off the screen 11. The translation and rotation of each reticle may be obtained by any convenient actuating mechanisms, not shown, in accordance with measured or computed parameters. The reticles, however, are movable only in planes normal to their respective axes A, B and C. Translation of the reticles will produce a proportionately larger translation of the illuminated symbol projected on the screen 11 but in the opposite direction. For example, in FIG. 1, upward translation of the reticle 26 from a center position on the axis A' will produce a proportional translation of the image or symbol downward on the screen 11 from the axis A. The magnitude of movement of the illuminated symbols or projected image with respect to the movement of the reticles is determined by the magnification factor of the projectors 13, 14 and 15.

Thus, it should be now apparent that the present invention makes use of a non-movable optical system completely isolated from mechanical motions. Except for manufacturing tolerances of lens components, the invention is distortion-free and requires no compensating devices. The particular arrangement of the optical system relative to the light beam also provides for the most efficient use of a light source whereby relatively low-wattage projection lamp may be used without sacrificing clarity of symbol projection of the display screen.

It should be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. An optical display apparatus comprising: a planar screen, projector means having the optical axis normal to said screen and having a field of view including the area of said screen, a source of light, condenser means next to said source directing a light beam into said projector means on an axis angularly displaced from the optical axis, and a reticle means interpositioned between said condenser means and said projector means to form an illuminated object for projection, said reticle means adapted to be translatable in a plane normal to the optical axis in accordance with an input parameter, and said reticle means being positioned with the center of translation on the light beam axis and from said projector means along the optical axis to form an illuminated symbol on a focal plane at said screen.

2. An optical display apparatus comprising: a planar screen, a plurality of projecting lenses laterally displaced from each other, each of said projecting lenses having the optical axis normal to said screen and having a field of view at least covering said screen, a single source of light, condenser means next to said source of light respectively directing light beams through said projecting lenses on axes angularly displaced from the respective optical axes and converging near the center of said screen, and reticles respectively interpositioned between each of said condenser means and said projecting lenses to form illuminated objects for projection, said reticles adapted to be translatable in planes normal to the optical axes in accordance with input parameters, and said reticles being positioned with the center of translation on the light beam axes and from said respective projecting lenses along the respective optical axes to form illuminated symbols on a focal plane at said screen.

3. An optical display apparatus comprising: a planar screen, a plurality of projector means laterally displaced from each other, each of said projector means having the optical axis normal to said screen and having a field of view at least covering said screen, a single source of light, condenser means next to said source of light respectively directing light beams into said projector lenses on axes angularly displaced from the respective optical axes, reflecting mirrors cooperating with said condenser lenses for directing light beams through said projector means and converging near the center of said screen, and movable reticles respectively interpositioned between each of said reflecting mirrors and said projector means to form illuminated objects for projection, said reticles being positioned on the light beam axes and from said respective projector means along the respective optical axes to form illuminated symbols on a focal plane at said screen.

4. An optical display apparatus comprising: a planar screen, a plurality of projecting lenses laterally displaced from each other, each of said projecting lenses having the optical axis normal to said screen and having a field of view at least covering said screen, a single source of light, condenser lenses next to said source of light respectively directing light beams into said projecting lenses on axes angularly displaced from the respective optical axes, reflecting mirrors cooperating with said condenser lenses for directing light beams through said projecting lenses and converging near the center of said screen, and reticles respectively interpositioned between each of said reflecting mirrors and said projecting lenses to form illuminated objects for projection, said reticles adapted to be translatable and rotatable in planes normal to the optical axes in accordance with input parameters, and said reticles being positioned with the center of translation on the light beam axes and from said respective projecting lenses along the respective optical axes to form illuminated symbols on a focal plane at said screen.

5. An optical display apparatus for use in tactical navigation systems, comprising: a housing open at the front end, translucent planar screen enclosing the front end of said housing, a plurality of projecting lenses laterally displaced from each other mounted in said housing, each of said projecting lenses having the optical axis normal to said screen and having a field of view including the area of said screen, a single source of light mounted in said housing, condenser means positioned respectively laterally and in front of said source, said front-positioned condenser means directing a light beam from said source through each of said projecting lenses and converging near the center of said screen, and reticles respectively interpositioned between said source and said projecting lenses to form illuminated objects for projection, said reticles adapted to be translatable in planes normal to the optical axes in accordance with input parameters, and said reticles being positioned with the center of translation on the light beam axes and from said respective projecting lenses along the respective optical axes to form illuminated symbols on a focal plane at said screen.

6. An optical display apparatus for use in tactical navigation systems, comprising: a housing open at the front end, translucent planar screen enclosing the front end of said housing, a plurality of projector means laterally displaced from each other mounted in said housing, each of said projector means having the optical axis normal to said screen and having a field of view including the area of said screen, a single source of light mounted in said housing, condenser means positioned respectively laterally and in front of said source, said front-positioned condenser means directing a light beam being coincident with the optical axis of said one of said one projector means, reflecting mirrors cooperating with said laterally positioned condenser means for directing light beams from said source through the other of said projector means, the axes of said latter beams being angularly displaced from the respective optical axes of said other projector means for converging said latter beams near the center of said screen, and reticles respectively interpositioned between said source and said projector means to form illuminated objects for projection, said reticles being positioned on the light beam axes and from said respective projector means along the respective optical axes to form illuminated symbols on a focal plane at said screen.

7. An optical display apparatus for use in tactical navigation systems, comprising: a housing open at the front end, translucent planar screen enclosing the front end of said housing, a plurality of projecting lenses laterally displaced from each other mounted in said housing, each of said projecting lenses having the optical axis normal to said screen and having a field of view including the area of said screen, a single source of light mounted in said housing, condensing lenses positioned respectively laterally and in front of said source, said front-positioned condensing lens directing a light beam from said source through one of said projecting lenses, the axis of said light beam being coincident with the optical axis of said one projecting lens, reflecting mirrors cooperating with said laterally positioned condensing lenses for directing light beams from said source through the other of said projecting lenses, the axes of said latter beams being angularly displaced from the respective optical axes of said projecting lenses for converging said latter beams near the center of said screen, and reticles respectively interpositioned between said source and said projecting lenses to form illuminated objects for projection, said reticles adapted to be translatable and rotatable in planes normal to the optical axes in accordance with input parameters, and said reticles being positioned with the center of translation on the light beam axes and from said respective projecting lenses along the respective optical axes to form illuminated symbols on a focal plane at said screen.

8. An optical display apparatus for use in tactical navigation systems, comprising: a housing open at the front end, a translucent planar screen enclosing the front end of said housing, a first projecting lens mounted in said housing having the optical axis thereof intersecting the center of said screen normal thereto, second and third projecting lenses mounted in said housing equidistantly displaced on opposite sides of said first projecting lens with their optical axes parallel to said first projecting lens axis, each of said projecting lenses having a field of view including the area of said screen, a single source of light mounted in said housing, first condenser means positioned next to said source of light for directing a first light beam into said first projecting lens, the axis of said light beam being coincident with the optical axis of said first projecting lens, second and third condenser means laterally positioned next to opposite sides of said source for directing respective light beams normal to said first light beams, first and second reflecting means respectively cooperating with said laterally positioned condenser means for directing said second and third light beams through said second and third projecting lenses, the axes of said second and third beams being angularly displaced from the respective optical axes of said second and third projecting lenses for converging said second and third beams near the center of said screen, and reticle means respectively interpositioned between each of said reflecting means and said projecting lenses to form illuminated objects for projection, said reticle means adapted to be translatable and rotatable in planes normal to the optical axes in accordance with input parameters, and said reticle means being positioned with the center of translation on the light beam axes and from said respective projecting lenses along the respective optical axes to form illuminated symbols on a focal plane at said screen.

9. An optical display apparatus for use in tactical navigation systems, comprising: a housing open at the front end, a rectangular translucent planar screen enclosing the front end of said housing, a first projecting lens mounted in said housing having the optical axis thereof intersecting the center of said screen normal thereto, second and third projecting lenses mounted in said housing equidistantly displaced on opposite sides of said first projecting lens with their optical axes parallel to said first projecting lens axis, each of said projecting lenses having a field of view including the area of said screen, a single source of light mounted in said housing, first condenser lenses positioned next to said source of light for directing a first light beam into said first projecting lens, the axis of said light beam being coincident with the optical axis of said first projecting lens, second and third condenser lenses laterally positioned next to opposite sides of said source for directing respective light beams normal to said first light beams, first and second reflecting mirrors respectively cooperating with said laterally positioned condenser lenses for directing said second and third light beams through said second and third projecting lenses, the axes of said second and third beams being angularly displaced from the respective optical axes of said second and third projecting lenses for converging said second and third beams near the center of said screen, reticles respectively interpositioned between each of said reflecting mirrors and said projecting lenses to form illuminated objects for projection, said reticles adapted to be translatable and rotatable in planes normal to the optical axes in accordance with input parameters, and said reticles being positioned with the center of translation on the light beam axes and from said respective projecting lenses along the respective optical axes to form illuminated symbols on a focal plane at said screen, and filter means positioned between said light source and said second and third condenser lenses for color-coding the symbols.

References Cited by the Examiner

UNITED STATES PATENTS

| | | | |
|---|---|---|---|
| 1,163,192 | 12/15 | Adams | 88—24 |
| 1,700,252 | 1/29 | Cox | 88—24 |
| 1,863,099 | 6/32 | Bowen | 88—24 |
| 2,021,507 | 11/35 | Hanks | 88—16.6 |
| 2,525,598 | 10/50 | Gruber | 88—24 |
| 2,717,530 | 9/55 | Morphis et al. | 88—26 |

EVON C. BLUNK, *Primary Examiner.*

EMIL G. ANDERSON, *Examiner.*